under 35 U.S.C. 154(b) by 449 days.

(12) United States Patent
Huang

(10) Patent No.: US 7,895,757 B1
(45) Date of Patent: Mar. 1, 2011

(54) GARDENING SHEARS HAVING ENERGY-SAVING FUNCTION

(75) Inventor: Yao-Chung Huang, Changhua Hsien (TW)

(73) Assignee: Ho Cheng Garden Tools Co., Ltd., Changhua Hsien (TW)

( * ) Notice: Subject to any disclaimer, the term of this patent is extended or adjusted under 35 U.S.C. 154(b) by 449 days.

(21) Appl. No.: 12/106,528

(22) Filed: Apr. 21, 2008

(51) Int. Cl.
*B26B 13/28* (2006.01)
(52) U.S. Cl. .......................................... 30/250; 30/192
(58) Field of Classification Search .................. 30/250, 30/251, 252, 261, 262, 193, 188, 190, 191, 30/192
See application file for complete search history.

(56) References Cited

U.S. PATENT DOCUMENTS 3,336,668 A * 8/1967 Groom ........................ 30/239
5,809,654 A * 9/1998 Huang ......................... 30/134
6,681,492 B1 * 1/2004 Huang ......................... 30/250
2009/0044412 A1 * 2/2009 Hsieh .......................... 30/252

FOREIGN PATENT DOCUMENTS

GB 2444912 * 5/2008

* cited by examiner

*Primary Examiner*—Stephen Choi
(74) *Attorney, Agent, or Firm*—Alan Kamrath; Kamrath & Associates PA

(57) ABSTRACT

A pair of gardening shears include a first cutting blade, a second cutting blade, and two extension arms. The second cutting blade has a first portion pivotally mounted on the first portion of the first cutting blade by a pivot bolt. Each of the extension arms has a first portion pivotally mounted on the mediate portion of the second cutting blade and a mediate portion movably mounted on the second portion of the first cutting blade by a guide pin. Thus, when the first cutting blade is driven by the extension arms to pivot toward the second cutting blade, the guide pin is movable outwardly relative to the pivot bolt to increase a length between the guide pin and the pivot bolt to increase the force arm length and to produce a larger cutting force by the leverage action.

16 Claims, 5 Drawing Sheets

US 7,895,757 B1

GARDENING SHEARS HAVING ENERGY-SAVING FUNCTION

BACKGROUND OF THE INVENTION

1. Field of the Invention

The present invention relates to a pair of shears and, more particularly, to a pair of gardening shears to shear a plant.

2. Description of the Related Art

A pair of conventional gardening shears comprise two cutting blades pivotally connected with each other and each having a front end provided with a cutting portion and a rear end provided with a handle for grip of a user. Thus, when the user applies a force on the handles of the two cutting blades, the two cutting blades are pivotable relative to each other to approach and close the cutting portions of the two cutting blades so as to cut an object (such as a branch) that is clamped between the cutting portions of the two cutting blades. However, when the object has a larger size, the cutting portions of the two cutting blades cannot cut the object easily and conveniently, so that the user has to exert a larger force to cut the object, thereby causing inconvenience to the user, and thereby wasting the user's energy.

BRIEF SUMMARY OF THE INVENTION

In accordance with the present invention, there is provided a pair of gardening shears, comprising: a first cutting blade, a second cutting blade, and two extension arms. The first cutting blade has a first portion, a second portion and a mediate portion located between the first portion and the second portion. The second cutting blade has a first portion, a second portion and a mediate portion located between the first portion and the second portion. The first portion of the second cutting blade is pivotally mounted on the first portion of the first cutting blade. Each of the two extension arms has a first portion, a second portion and a mediate portion located between the first portion and the second portion. The first portion of each of the two extension arms is pivotally mounted on the mediate portion of the second cutting blade. The mediate portion of each of the two extension arms is movably mounted on the second portion of the first cutting blade.

The primary objective of the present invention is to provide a pair of gardening shears having energy-saving function.

Another objective of the present invention is to provide a pair of gardening shears, wherein when the first cutting blade is driven by the two extension arms to pivot toward the second cutting blade, the guide pin is movable outwardly relative to the pivot bolt to increase a length between the guide pin and the pivot bolt to increase the force arm length of the first cutting blade, the second cutting blade and the two extension arms and to produce a larger cutting force by the leverage action so as to cut the object easily and quickly in an energy-saving manner, thereby achieving an energy-saving purpose, and thereby facilitating a user operating the gardening shears.

A further objective of the present invention is to provide a pair of gardening shears, wherein when the second portion of the first cutting blade is driven by the mediate portion of each of the two extension arms, the guide pin is driven by the drive hole of the mediate portion of each of the two extension arms and is slidable in the guide slot of the first cutting blade, so that each of the two extension arms and the first cutting blade are pivotable relative to the second cutting blade smoothly and exactly by guidance of the guide pin.

A further objective of the present invention is to provide a pair of gardening shears, wherein the bushing is located between the guide pin and the guide slot of the first cutting blade to reduce the friction between the guide pin and the guide slot of the first cutting blade.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
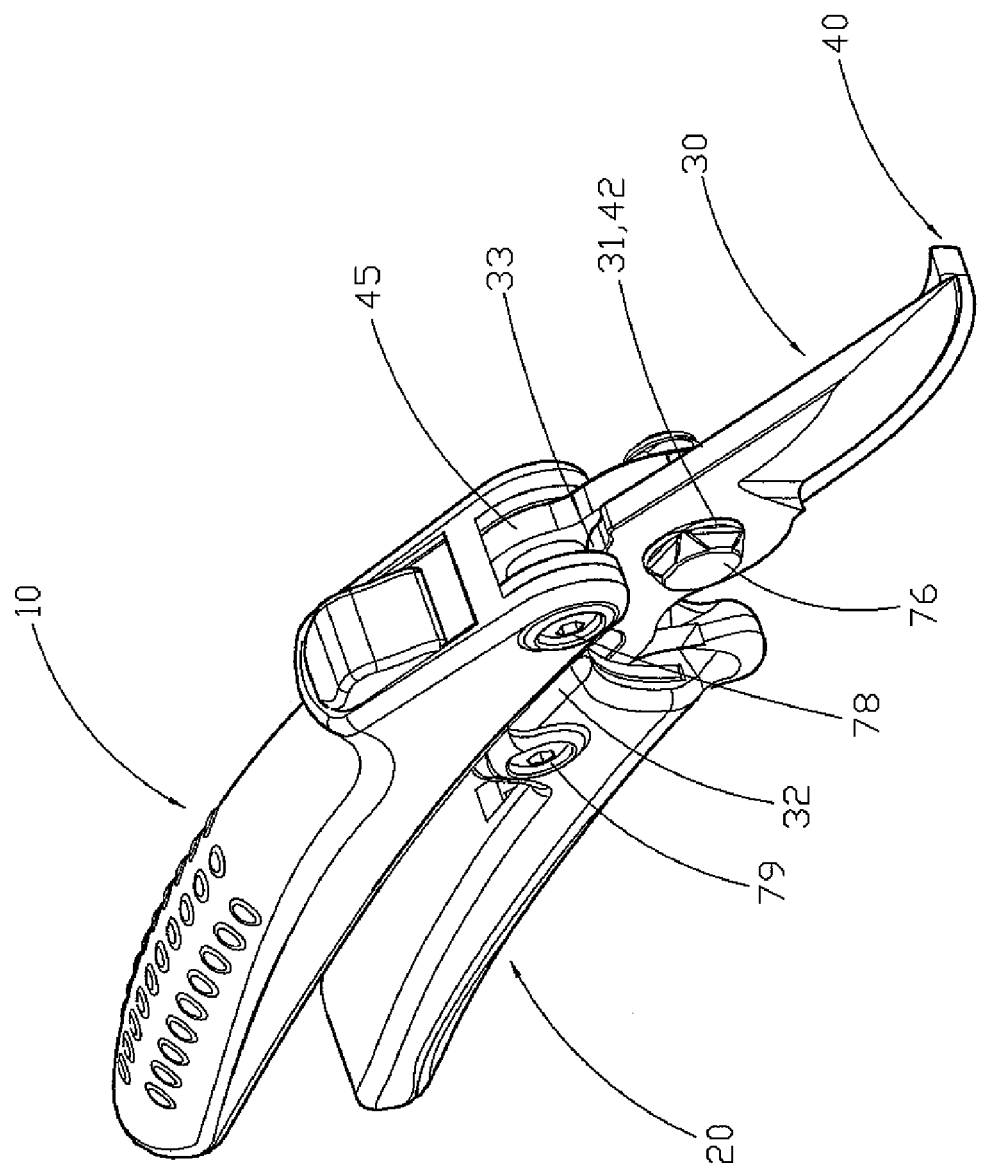
FIG. 1 is a perspective view of a pair of gardening shears in accordance with the preferred embodiment of the present invention.
Figure 2:
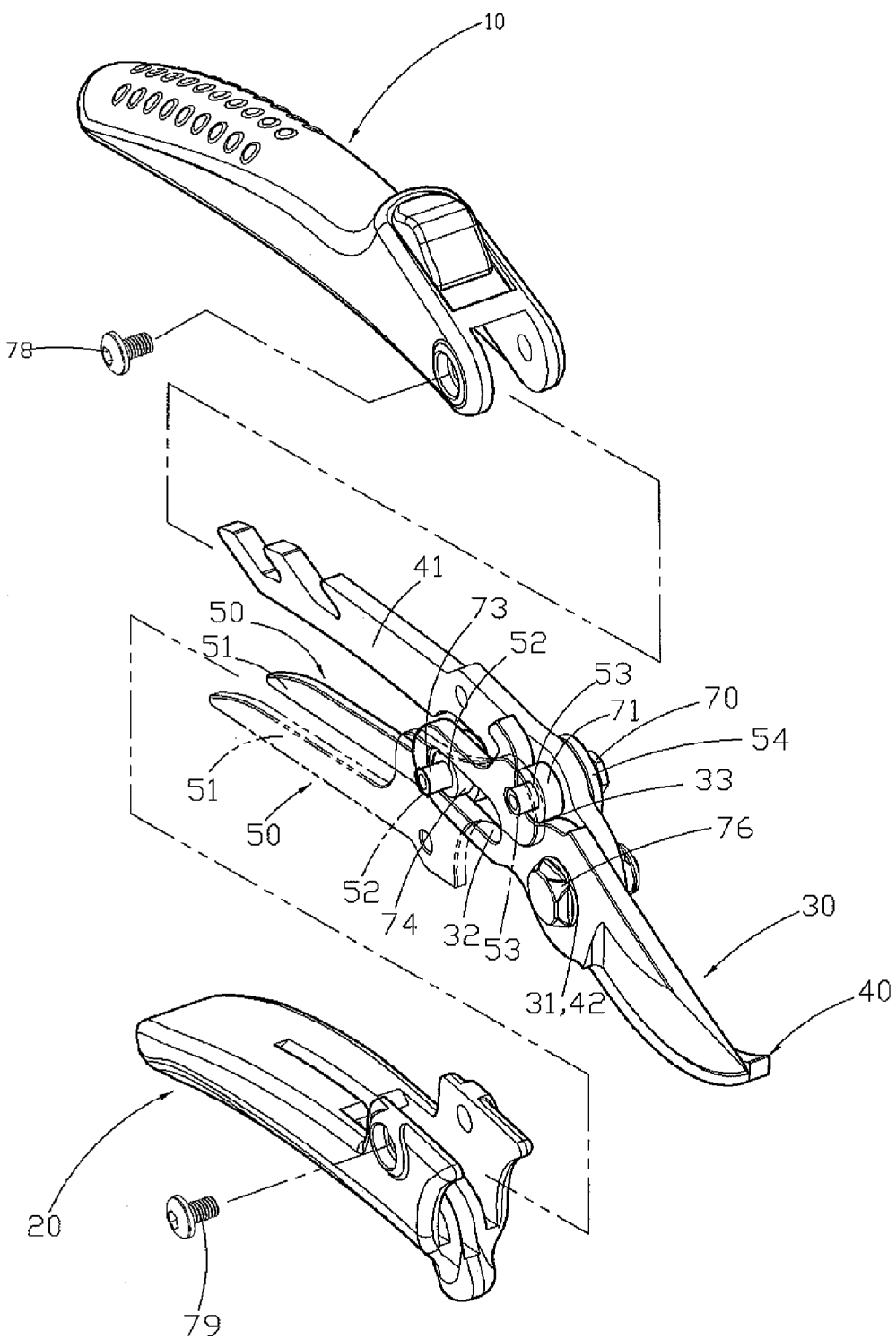
FIG. 2 is a partially exploded perspective view of the gardening shears as shown in FIG. 1.
Figure 3:
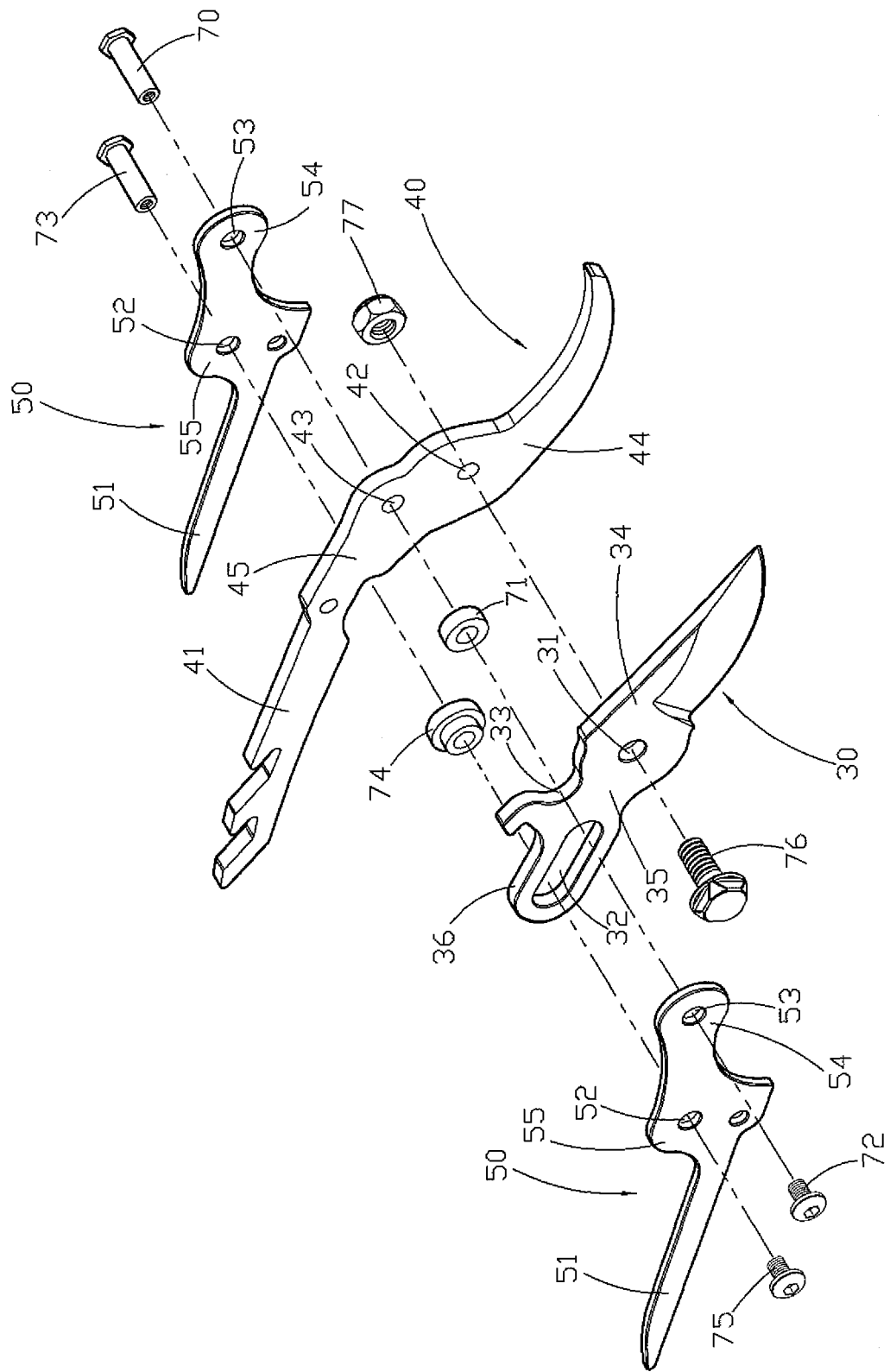
FIG. 3 is a partially exploded perspective view of the gardening shears as shown in FIG. 1.

Referring to the drawings and initially to FIGS. 1-3, a pair of gardening shears in accordance with the preferred embodiment of the present invention comprise a first cutting blade 30, a second cutting blade 40, two extension arms 50, a first handle 10, and a second handle 20.

The first cutting blade 30 has a first portion 34, a second portion 36 and a mediate portion 35 located between the first portion 34 and the second portion 36.

The second cutting blade 40 has a first portion 44, a second portion 41 and a mediate portion 45 located between the first portion 44 and the second portion 41. The first portion 44 of the second cutting blade 40 is pivotally mounted on the first portion 34 of the first cutting blade 30.

Each of the two extension arms 50 has a first portion 54, a second portion 51 and a mediate portion 55 located between the first portion 54 and the second portion 51. The first portion 54 of each of the two extension arms 50 is pivotally mounted on the mediate portion 45 of the second cutting blade 40. The mediate portion 55 of each of the two extension arms 50 is movably mounted on the second portion 36 of the first cutting blade 30.

The first handle 10 is secured on the second portion 41 of the second cutting blade 40 by a locking screw 78 to move the second cutting blade 40.

The second handle 20 is secured on the second portion 51 of each of the two extension arms 50 by a locking screw 79 to move each of the two extension arms 50.

In the preferred embodiment of the present invention, the first portion 44 of the second cutting blade 40 is pivotally connected with the first portion 34 of the first cutting blade 30 by a pivot. bolt 76 and a fastening nut 77, the first portion 54 of each of the two extension arms 50 is pivotally connected with the mediate portion 45 of the second cutting blade 40 by a threaded pivot pin 70 and a pivot screw 72, and the mediate portion 55 of each of the two extension arms 50 is movably mounted on the second portion 36 of the first cutting blade 30 by a threaded guide pin 73 and a fastening screw 75.

The first cutting blade 30 abuts the second cutting blade 40. The first cutting blade 30 and the second cutting blade 40 are sandwiched between the two extension arms 50. The first portion 34 of the first cutting blade 30 is provided with a main pivot hole 31 pivotally mounted on the pivot bolt 76. The mediate portion 35 of the first cutting blade 30 has a periphery provided with a substantially arc-shaped limit recess 33 to allow passage of the pivot pin 70. The second portion 36 of the first cutting blade 30 is provided with an elongate guide slot 32 in which the guide pin 73 is slidable.

The second cutting blade 40 has a length greater than that of the first cutting blade 30, and the second portion 41 of the second cutting blade 40 protrudes outwardly from the second portion 36 of the first cutting blade 30. The first portion 44 of the second cutting blade 40 is provided with a main pivot bore 42 pivotally mounted on the pivot bolt 76. The mediate portion 45 of the second cutting blade 40 is provided with an eccentric pivot bore 43 pivotally mounted on the pivot pin 70.

Each of the two extension arms 50 has a substantially Z-shaped profile. The first portion 54 of each of the two extension arms 50 is provided with an eccentric pivot hole 53 pivotally mounted on the pivot pin 70. The mediate portion 55 of each of the two extension arms 50 is connected with the second portion 36 of the first cutting blade 30 by the guide pin 73 which is slidable in the guide slot 32 of the first cutting blade 30. The mediate portion 55 of each of the two extension arms 50 has a bent shape and is provided with a drive hole 52 secured on the guide pin 73 to drive the guide pin 73 to move in the guide slot 32 of the first cutting blade 30 when each of the two extension arms 50 is pivotable about the pivot pin 70. The second portion 51 of each of the two extension arms 50 protrudes outwardly from the second portion 36 of the first cutting blade 30.

The gardening shears further comprise a washer 71 mounted on the pivot pin 70 and movable to abut the limit recess 33 of the first cutting blade 30, and a stepped bushing 74 mounted on the guide pin 73 and located between the guide pin 73 and the guide slot 32 of the first cutting blade 30 to reduce the friction between the guide pin 73 and the guide slot 32 of the first cutting blade 30.

Figure 4:
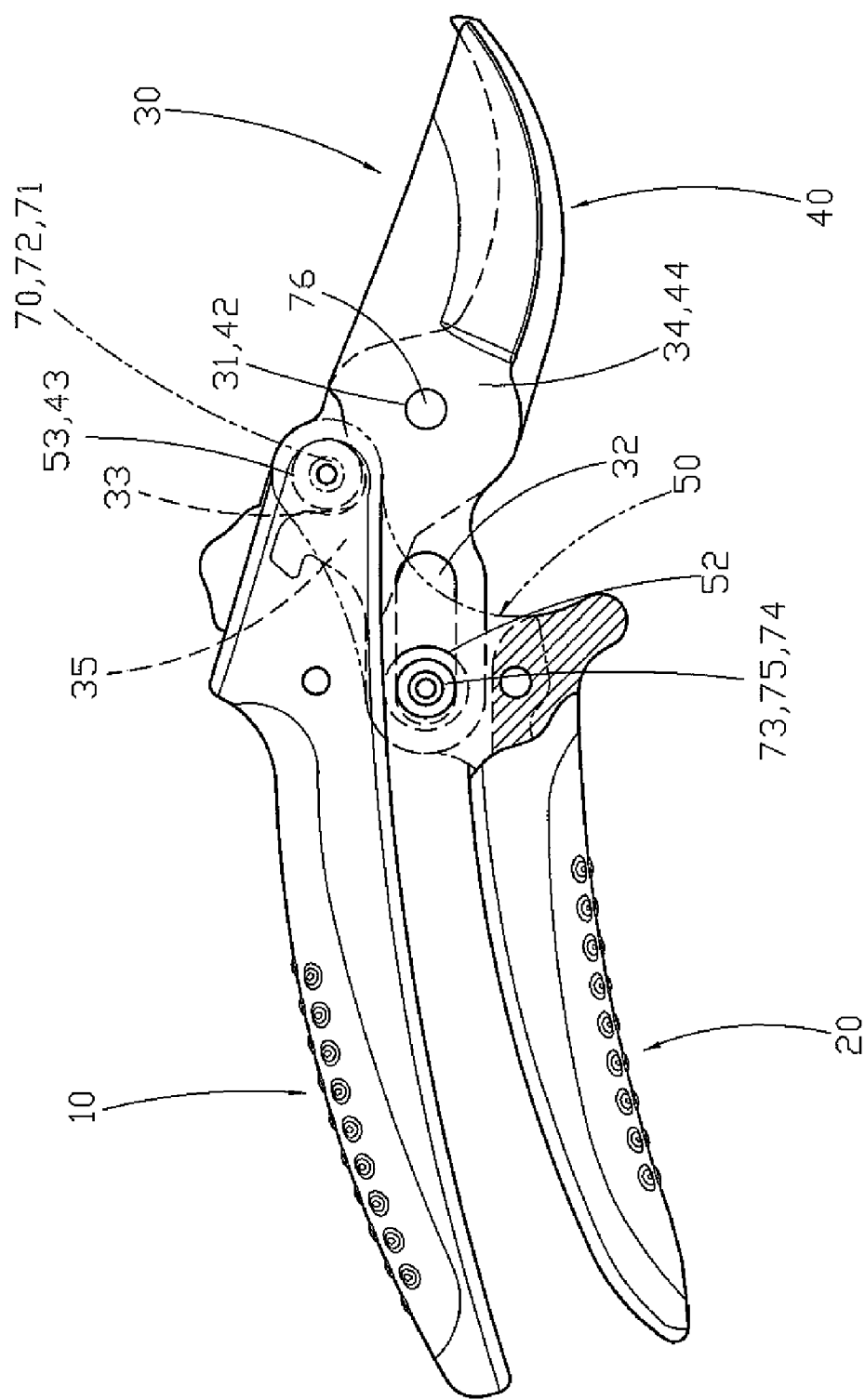
FIG. 4 is a partially side cross-sectional view of the gardening shears as shown in FIG. 1.
Figure 5:
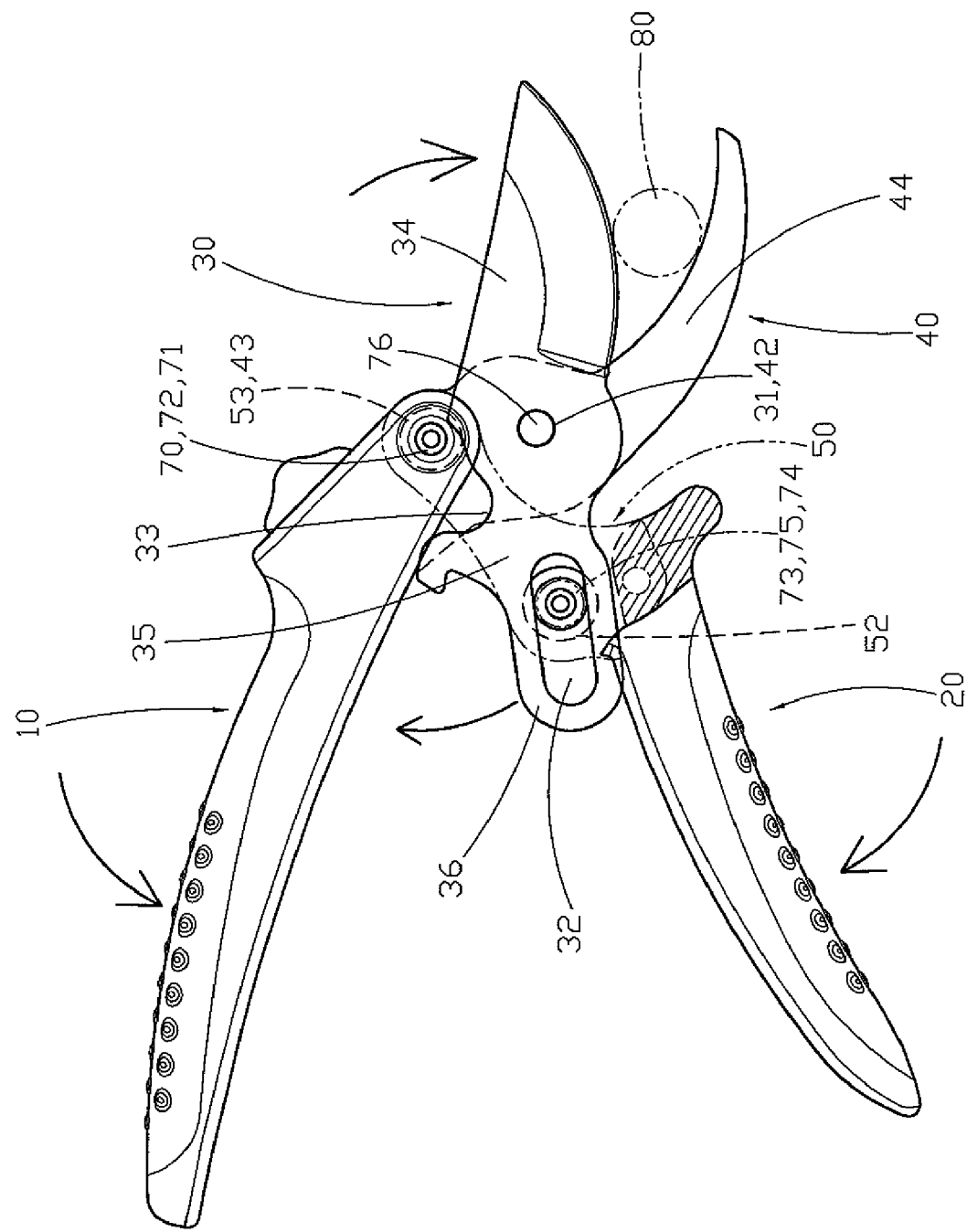
FIG. 5 is a schematic operational view of the gardening shears as shown in FIG. 4.

In operation, referring to FIGS. 4 and 5 with reference to FIGS. 1-3, the second portion 51 of each of the two extension arms 50 is driven by the second handle 20, and the second portion 41 of the second cutting blade 40 is driven by the first handle 10, so that when the second portion 51 of each of the two extension arms 50 is movable relative to the second portion 41 of the second cutting blade 40, each of the two extension arms 50 is pivotable relative to the second cutting blade 40.

At this time, the first portion 54 of each of the two extension arms 50 is pivotally mounted on the mediate portion 45 of the second cutting blade 40, the mediate portion 55 of each of the two extension arms 50 is connected with the second portion 36 of the first cutting blade 30 by the guide pin 73 which is slidable in the guide slot 32 of the first cutting blade 30, and the first portion 34 of the first cutting blade 30 is pivotally connected with the first portion 44 of the second cutting blade 40, so that when each of the two extension arms 50 is pivotable relative to the second cutting blade 40, the second portion 36 of the first cutting blade 30 is driven by the mediate portion 55 of each of the two extension arms 50 to move relative to the second portion 41 of the second cutting blade 40, and the first cutting blade 30 is pivotable outwardly relative to the second cutting blade 40 from the position as shown in FIG. 4 to the position as shown in FIG. 5 to open the first portion 34 of the first cutting blade 30 and the first portion 44 of the second cutting blade 40 so as to cut an object 80, such as the branch of a plant.

At the same time, when the second portion 36 of the first cutting blade 30 is driven by the mediate portion 55 of each of the two extension arms 50, the guide pin 73 is driven by the drive hole 52 of the mediate portion 55 of each of the two extension arms 50 and is slidable in the guide slot 32 of the first cutting blade 30, so that each of the two extension arms 50 and the first cutting blade 30 are pivotable relative to the second cutting blade 40 smoothly and exactly by guidance of the guide pin 73.

It is to be noted that, the washer 71 is movable to abut the limit recess 33 of the first cutting blade 30 when the first portion 34 of the first cutting blade 30 abuts the first portion 44 of the second cutting blade 40 as shown in FIG. 4 and is detachable from the limit recess 33 of the first cutting blade 30 when the first portion 34 of the first cutting blade 30 is detachable from the first portion 44 of the second cutting blade 40 as shown in FIG. 5.

In practice, when the first cutting blade 30 is driven by each of the two extension arms 50 to pivot toward the second cutting blade 40 from the position as shown in FIG. 5 to the position as shown in FIG. 4 to cut the object 80, the guide pin 73 is slidable in the guide slot 32 of the first cutting blade 30 and is movable outwardly relative to the pivot bolt 76 to increase a length between the guide pin 73 and the pivot bolt 76 to increase the force arm length of the first cutting blade 30, the second cutting blade 40 and the two extension arms 50 and to produce a larger cutting force by the leverage action so as to cut the object 80 easily and quickly in an energy-saving manner, thereby achieving an energy-saving purpose.

Accordingly, when the first cutting blade 30 is driven by the two extension arms 50 to pivot toward the second cutting blade 40, the guide pin 73 is movable outwardly relative to the pivot bolt 76 to increase a length between the guide pin 73 and the pivot bolt 76 to increase the force arm length of the first cutting blade 30, the second cutting blade 40 and the two extension arms 50 and to produce a larger cutting force by the leverage action so as to cut the object 80 easily and quickly in an energy-saving manner, thereby achieving an energy-saving purpose, and thereby facilitating a user operating the gardening shears. In addition, when the second portion 36 of the first cutting blade 30 is driven by the mediate portion 55 of each of the two extension arms 50, the guide pin 73 is driven by the drive hole 52 of the mediate portion 55 of each of the two extension arms 50 and is slidable in the guide slot 32 of the first cutting blade 30, so that each of the two extension arms 50 and the first cutting blade 30 are pivotable relative to the second cutting blade 40 smoothly and exactly by guidance of the guide pin 73. Further, the bushing 74 is located between the guide pin 73 and the guide slot 32 of the first cutting blade 30 to reduce the friction between the guide pin 73 and the guide slot 32 of the first cutting blade 30.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A pair of gardening shears, comprising: a first cutting blade, a second cutting blade, and two extension arms, wherein:

the first cutting blade has a first portion, a second portion and a mediate portion located between the first portion and the second portion;

the second cutting blade has a first portion, a second portion and a mediate portion located between the first portion and the second portion;

the first portion of the second cutting blade is pivotally mounted on the first portion of the first cutting blade;

each of the two extension arms has a first portion, a second portion and a mediate portion located between the first portion and the second portion;

the first portion of each of the two extension arms is pivotally mounted on the mediate portion of the second cutting blade;

the mediate portion of each of the two extension arms is movably mounted on the second portion of the first cutting blade;

the first portion of the second cutting blade is pivotally connected with the first portion of the first cutting blade by a pivot bolt;

the first portion of each of the two extension arms is pivotally connected with the mediate portion of the second cutting blade by a pivot pin;

the mediate portion of each of the two extension arms is movably mounted on the second portion of the first cutting blade by a guide pin.

2. The gardening shears in accordance with claim 1, wherein the first portion of the first cutting blade is provided with a main pivot hole pivotally mounted on the pivot bolt;

the first portion of the second cutting blade is provided with a main pivot bore pivotally mounted on the pivot bolt.

3. The gardening shears in accordance with claim 1, wherein the mediate portion of the first cutting blade has a periphery provided with a substantially arc-shaped limit recess to allow passage of the pivot pin.

4. The gardening shears in accordance with claim 3, further comprising:

a washer mounted on the pivot pin and movable to abut the limit recess of the first cutting blade.

5. The gardening shears in accordance with claim 4, wherein the washer is movable to abut the limit recess of the first cutting blade when the first portion of the first cutting blade abuts the first portion of the second cutting blade;

the washer is detachable from the limit recess of the first cutting blade when the first portion of the first cutting blade is detachable from the first portion of the second cutting blade.

6. The gardening shears in accordance with claim 1, wherein the second portion of the first cutting blade is provided with an elongate guide slot;

the guide pin is slidable in the guide slot of the first cutting blade.

7. The gardening shears in accordance with claim 6, wherein the mediate portion of each of the two extension arms is provided with a drive hole secured on the guide pin to drive the guide pin to move in the guide slot of the first cutting blade when each of the two extension arms is pivotable about the pivot pin.

8. The gardening shears in accordance with claim 6, further comprising:

a stepped bushing mounted on the guide pin and located between the guide pin and the guide slot of the first cutting blade to reduce a friction between the guide pin and the guide slot of the first cutting blade.

9. The gardening shears in accordance with claim 6, wherein when the second portion of each of the two extension arms is movable relative to the second portion of the second cutting blade, each of the two extension arms is pivotable relative to the second cutting blade;

when each of the two extension arms is pivotable relative to the second cutting blade, the second portion of the first cutting blade is driven by the mediate portion of each of the two extension arms to move relative to the second portion of the second cutting blade, and the first cutting blade is pivotable relative to the second cutting blade;

when the second portion of the first cutting blade is driven by the mediate portion of each of the two extension arms, the guide pin is driven by the mediate portion of each of the two extension arms and is slidable in the guide slot of the first cutting blade.

10. The gardening shears in accordance with claim 6, wherein when the first cutting blade is driven by each of the two extension arms to pivot toward the second cutting blade, the guide pin is slidable in the guide slot of the first cutting blade and is movable outwardly relative to the pivot bolt to increase a length between the guide pin and the pivot bolt.

11. The gardening shears in accordance with claim 6, wherein the mediate portion of each of the two extension arms is connected with the second portion of the first cutting blade by the guide pin.

12. The gardening shears in accordance with claim 1, wherein the mediate portion of the second cutting blade is provided with an eccentric pivot bore pivotally mounted on the pivot pin;

the first portion of each of the two extension arms is provided with an eccentric pivot hole pivotally mounted on the pivot pin.

13. The gardening shears in accordance with claim 1, wherein each of the two extension arms has a substantially Z-shaped profile.

14. The gardening shears in accordance with claim 1, wherein the first cutting blade abuts the second cutting blade;

the first cutting blade and the second cutting blade are sandwiched between the two extension arms.

15. The gardening shears in accordance with claim 1, wherein the second cutting blade has a length greater than that of the first cutting blade;

the second portion of the second cutting blade protrudes outwardly from the second portion of the first cutting blade;

the second portion of each of the two extension arms protrudes outwardly from the second portion of the first cutting blade.

16. A pair of gardening shears, comprising: a first cutting blade, a second cutting blade, and two extension arms, wherein:

the first cutting blade has a first portion, a second portion and a mediate portion located between the first portion and the second portion;

the second cutting blade has a first portion, a second portion and a mediate portion located between the first portion and the second portion;

the first portion of the second cutting blade is pivotally mounted on the first portion of the first cutting blade;

each of the two extension arms has a first portion, a second portion and a mediate portion located between the first portion and the second portion;

the first portion of each of the two extension arms is pivotally mounted on the mediate portion of the second cutting blade;

the mediate portion of each of the two extension arms is movably mounted on the second portion of the first cutting blade;

the gardening shears further comprise:

a first handle secured on the second portion of the second cutting blade by a first locking screw to move the second cutting blade;

a second handle secured on the second portion of each of the two extension arms by a second locking screw to move each of the two extension arms.

* * * * *